United States Patent
Ochida et al.

(10) Patent No.: US 10,435,025 B2
(45) Date of Patent: Oct. 8, 2019

(54) VEHICLE CONTROL DEVICE

(71) Applicant: HONDA MOTOR CO., LTD., Minato-ku, Tokyo (JP)

(72) Inventors: Jun Ochida, Wako (JP); Tadahiko Kanou, Wako (JP); Takashi Kuboshima, Wako (JP); Ken Hanayama, Wako (JP); Hiroaki Horii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 15/843,068

(22) Filed: Dec. 15, 2017

(65) Prior Publication Data
US 2018/0170389 A1 Jun. 21, 2018

(30) Foreign Application Priority Data
Dec. 21, 2016 (JP) .................. 2016-247365

(51) Int. Cl.
*B60W 30/18* (2012.01)
*B60W 50/10* (2012.01)
*B60W 40/04* (2006.01)

(52) U.S. Cl.
CPC ...... *B60W 30/18163* (2013.01); *B60W 40/04* (2013.01); *B60W 50/10* (2013.01); *B60W 2540/10* (2013.01); *B60W 2550/30* (2013.01)

(58) Field of Classification Search
CPC ........... B60W 30/18163; B60W 40/04; B60W 50/10; B60W 2540/10; B60W 2550/30
USPC ......................................................... 701/23
See application file for complete search history.

(56) References Cited

U.S. PATENT DOCUMENTS

| | | | |
|---|---|---|---|
| 2006/0152346 A1 | 7/2006 | Maass et al. | |
| 2016/0272204 A1* | 9/2016 | Takahashi | B60W 30/143 |
| 2016/0032575 A1 | 11/2016 | Kanda et al. | |
| 2016/0325750 A1 | 11/2016 | Kanda et al. | |

(Continued)

FOREIGN PATENT DOCUMENTS

| | | |
|---|---|---|
| JP | 60-261736 | 12/1985 |
| JP | 2005-529420 | 9/2005 |
| JP | 2015-174494 | 10/2015 |

(Continued)

OTHER PUBLICATIONS

Japanese Office Action for Japanese Patent Application No. 2016-247365 dated Jan. 8, 2019.

(Continued)

*Primary Examiner* — Gertrude Arthur Jeanglaude
(74) *Attorney, Agent, or Firm* — Amin, Turocy & Watson LLP

(57) ABSTRACT

A vehicle operation setting unit determines vehicle operations of a host vehicle. When a course change is performed, the vehicle operation setting unit sets values (at least one of target values for a velocity, an acceleration/deceleration, a curvature, a yaw rate, a steering angle, and a lateral G force) to be less than or equal to upper limit values thereof. The vehicle operation setting unit causes the upper limit values to differ between a case in which a preceding vehicle is recognized by an external environment recognition unit, and a case in which a preceding vehicle is not recognized by the external environment recognition unit.

10 Claims, 8 Drawing Sheets

(56) References Cited

U.S. PATENT DOCUMENTS

2017/0001642 A1* 1/2017 Kumai ................ B62D 15/025

FOREIGN PATENT DOCUMENTS

| JP | 2016-009200 | 1/2016 |
| JP | 2016-212630 | 12/2016 |

OTHER PUBLICATIONS

Japanese Office Action for Japanese Patent Application No. 2016-247365 dated Jun. 5, 2018.

* cited by examiner

VEHICLE CONTROL DEVICE

CROSS-REFERENCE TO RELATED APPLICATION

This application is based upon and claims the benefit of priority from Japanese Patent Application No. 2016-247365 filed on Dec. 21, 2016, the contents of which are incorporated herein by reference.

BACKGROUND OF THE INVENTION

Field of the Invention

The present invention relates to a vehicle control device which is disposed in a host vehicle that is capable of making a course change automatically.

Description of the Related Art

In Japanese Laid-Open Patent Publication No. 2005-529420 (PCT), a method and apparatus are disclosed for carrying out a warning or steering intervention with respect to a driver, in the case that a lane change is predicted, and a lane marking that is crossed when making the lane change is a solid line.

Incidentally, in recent years, automatically driven vehicles have been developed in which a vehicle incorporated system executes a portion or all of a vehicle control (a driving force control, a steering control, and a braking control). In the case of an automatically driven vehicle in which a control for making a course change (including a lane change) is performed entirely by a host vehicle, for example, changes in course are performed automatically by the host vehicle determining, for example, a situation in which a preceding vehicle that is traveling at a low speed is overtaken, a situation in which the target lane is switched, and a situation in which the host vehicle approaches a branching point, or the like. Further, in the case of an automatically driven vehicle in which the driver determines the timing at which to change course, the host vehicle automatically performs the course change using an operation of a direction indicator (turn signal lever) by the driver as a trigger.

SUMMARY OF THE INVENTION

There are drivers who wish to quickly perform a vehicle control, for example, overtaking of a preceding vehicle, depending on the circumstances of the course change. Such drivers desire course change controls that differ between a time when overtaking is performed and a time when overtaking is not performed.

The present invention has been devised taking into consideration the aforementioned problem, and has the object of providing a vehicle control device which, during automated driving, is capable of executing a course change in accordance with a driver's intentions.

The present invention is characterized by a vehicle control device disposed in a host vehicle which is capable of making a course change automatically within a travel route, comprising an external environment recognition unit adapted to recognize a preceding vehicle traveling in front of the host vehicle, and a vehicle operation setting unit adapted to determine a vehicle operation of the host vehicle, and to set a value exhibited by the vehicle operation at a time of making the course change to be less than or equal to an upper limit value thereof, wherein the vehicle operation setting unit causes the upper limit value to differ between a case in which the preceding vehicle is recognized by the external environment recognition unit, and a case in which the preceding vehicle is not recognized by the external environment recognition unit.

There are drivers who wish for the vehicle operation of the host vehicle to change when a change in course is made, depending on the presence or absence of a preceding vehicle. In accordance with the aforementioned configuration, the vehicle operation of the host vehicle is changed when a change in course is made, depending on the presence or absence of a preceding vehicle. Therefore, the course change can be effected according to the intentions of the driver. As a result, marketability of the vehicle control device is enhanced.

The vehicle operation setting unit may set the upper limit value for the case in which the preceding vehicle is recognized by the external environment recognition unit and a course change to a target lane is not made to be greater than the upper limit value for the case in which the preceding vehicle is not recognized by the external environment recognition unit, and to be greater than the upper limit value for a case in which the course change to the target lane is made.

There are drivers who prefer the vehicle operation of the host vehicle to be increased when making a course change that involves overtaking of a preceding vehicle, whereas such drivers prefer the vehicle operation of the host vehicle not to be increased when making a course change caused simply by switching the target lane. In accordance with the above configuration, the vehicle operation of the host vehicle is increased when making a course change that involves overtaking of a preceding vehicle, and the vehicle operation of the host vehicle is not increased when making a course change caused simply by switching the target lane, and therefore, the course change can be effected according to the intentions of the driver. As a result, marketability of the vehicle control device is enhanced.

The course change is a lane change across a section line, and there may further be provided an overtaking determination unit adapted to determine, using a recognition result of the external environment recognition unit, whether or not the lane change is for the purpose of overtaking the preceding vehicle, wherein the vehicle operation setting unit may cause the upper limit value to differ between a case in which it is determined by the overtaking determination unit that the lane change is for the purpose of overtaking the preceding vehicle, and a case in which it is determined by the overtaking determination unit that the lane change is not for the purpose of overtaking the preceding vehicle.

There are drivers who wish for the vehicle operation of the host vehicle to change when a lane change is made, depending on whether or not a preceding vehicle is to be overtaken. In accordance with the aforementioned configuration, the vehicle operation of the host vehicle is changed when the lane change is made, depending on whether or not a preceding vehicle is to be overtaken, and therefore, the lane change can be effected according to the intentions of the driver. As a result, marketability of the vehicle control device is enhanced.

The vehicle operation setting unit may set the upper limit value for the case in which it is determined by the overtaking determination unit that the lane change is for the purpose of overtaking the preceding vehicle to be greater than the upper limit value for the case in which it is determined by the overtaking determination unit that the lane change is not for the purpose of overtaking the preceding vehicle.

There are drivers who wish for the vehicle operation of the host vehicle to increase when a lane change is made that involves overtaking of a preceding vehicle. In accordance with the above configuration, the vehicle operation of the host vehicle at a time of making a lane change that involves overtaking of a preceding vehicle can be made greater than the vehicle operation of the host vehicle at a time of making a lane change that does not involve overtaking of a preceding vehicle, and therefore, the lane change can be effected according to the intentions of the driver. As a result, marketability of the vehicle control device is enhanced.

The vehicle control device may further comprise a preceding vehicle velocity detection unit adapted to detect a travel velocity of the preceding vehicle, wherein, when making a lane change, in the case that the travel velocity detected by the preceding vehicle velocity detection unit is lower than a set vehicle velocity for the host vehicle, the overtaking determination unit may determine that the lane change is for the purpose of overtaking the preceding vehicle. In accordance with the aforementioned configuration, it is possible to easily detect a lane change that involves overtaking of a preceding vehicle.

The vehicle control device may further comprise a branching point detection unit adapted to detect whether or not a branching point exists in the travel route within a predetermined distance from the host vehicle, wherein, when making a lane change, in the case that the branching point is not detected by the branching point detection unit, the overtaking determination unit determines that the lane change is for the purpose of overtaking the preceding vehicle. In accordance with the aforementioned configuration, it is possible to easily detect a lane change that involves overtaking of a preceding vehicle.

The vehicle control device may further comprise a direction indication detection unit adapted to detect that a direction indicating operation of the host vehicle is being performed, and an accelerator pedal detection unit adapted to detect that an accelerator pedal operation of the host vehicle is being performed. When making a lane change, in the case that the direction indicating operation is detected by the direction indication detection unit, and the accelerator pedal operation is detected by the accelerator pedal detection unit, the overtaking determination unit may determine that the lane change is for the purpose of overtaking the preceding vehicle. In accordance with the aforementioned configuration, it is possible to easily detect a lane change that involves overtaking of a preceding vehicle.

The vehicle control device may further comprise a lane detection unit adapted to detect a travel lane in which the host vehicle travels, wherein, when making a lane change, in the case that a transition from the travel lane into a passing lane is detected by the lane detection unit, the overtaking determination unit may determine that the lane change is for the purpose of overtaking the preceding vehicle. In accordance with the aforementioned configuration, it is possible to easily detect a lane change that involves overtaking of a preceding vehicle.

The vehicle control device may further comprise a merging point detection unit adapted to detect whether or not a merging point exists in the travel route within a predetermined distance from the host vehicle, wherein, in the case that the merging point is detected by the merging point detection unit, the overtaking determination unit may determine that the lane change is not for the purpose of overtaking the preceding vehicle, even if a state exists by which it could be determined that the lane change is for the purpose of overtaking the preceding vehicle. In accordance with the aforementioned configuration, it is possible to easily detect a lane change that does not involve overtaking of a preceding vehicle.

The vehicle control device may further comprise a merging vehicle detection unit adapted to detect a merging vehicle that merges into the travel route in front of the host vehicle, wherein, in the case that the merging vehicle is detected by the merging vehicle detection unit, the overtaking determination unit may determine that the lane change is not for the purpose of overtaking the preceding vehicle, even if a state exists by which it could be determined that the lane change is for the purpose of overtaking the preceding vehicle. In accordance with the aforementioned configuration, it is possible to easily detect a lane change that does not involve overtaking of a preceding vehicle.

According to the present invention, the vehicle operation of the host vehicle is changed when a change in course is made, depending on the presence or absence of a preceding vehicle. Therefore, the course change can be effected according to the intentions of the driver. As a result, marketability of the vehicle control device is enhanced.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of a vehicle control device according to the present invention will be presented and described in detail below with reference to the accompanying drawings.

[1. Configuration of Vehicle Control System 10]

The vehicle control device according to the present invention constitutes a portion of a vehicle control system that is installed in a driver's own vehicle (also referred to herein as a host vehicle). A description of the vehicle control device will be presented below together with a description of the vehicle control system.

The term "lane" as used in the present specification is defined by section lines such as lane markings. The term "course change" as used in the present specification implies that the host vehicle changes a travel position thereof in a lateral direction within a travel route. For example, a lane change that takes place across a section line is included within the concept of a course change. Changing a travel position in a lateral direction on a travel route where lanes do not exist or are not clear, for example, at locations before and after a tollgate on an expressway, is also included within the concept of a course change. On the other hand, changing a travel position in a lateral direction within the same lane is not included within the concept of a course change.

[1.1 Overall Configuration]

Figure 1:
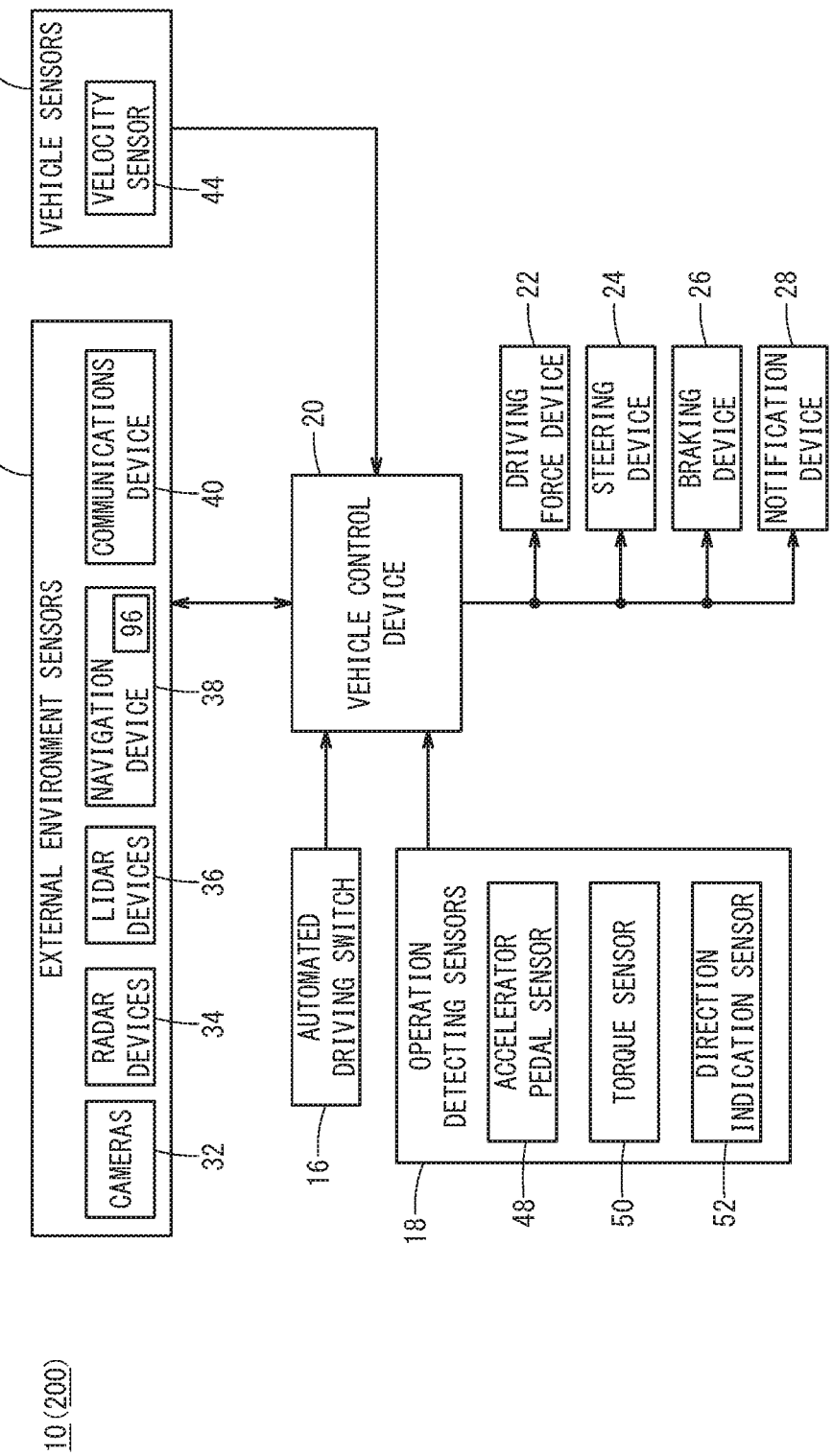
FIG. 1 is a block diagram showing a configuration of a vehicle control system equipped with a vehicle control device according to the present invention.

The vehicle control system 10 will now be described with reference to FIG. 1. The vehicle control system 10 is incorporated in a host vehicle 200, and performs a travel control for the host vehicle 200 by way of automated driving or manual driving. The term "automated driving" as used herein implies a concept that includes not only "fully automated driving" in which the travel control for the host vehicle 200 is performed entirely automatically, but also "partial automated driving" or "driving assistance" in which the travel control is partially performed automatically.

The vehicle control system 10 is basically made up from an input system device group, a vehicle control device 20, and an output system device group. The respective devices of the input system device group and the output system device group are connected via communication lines to the vehicle control device 20.

The input system device group includes external environment sensors 12, vehicle sensors 14, an automated driving switch 16, and operation detecting sensors 18. The output system device group includes a driving force device 22 for driving the vehicle wheels (not shown), a steering device 24 for steering the vehicle wheels, a braking device 26 for braking the vehicle wheels, and a notification device 28 for notifying the driver primarily through visual, auditory, and haptic sensation.

[1.2 Specific Configuration of Input Device Group]

The external environment sensors 12 acquire information (hereinafter referred to as external environmental information) indicative of the state of the external environment around the host vehicle 200, and output the acquired external environmental information to the vehicle control device 20. More specifically, the external environment sensors 12 are configured to include one or more cameras 32, one or more radar devices 34, one or more LIDAR devices 36 (Light Detection and Ranging; Laser Imaging Detection and Ranging), a navigation device 38, and a communications device 40.

The navigation device 38 is constituted to include a positioning device, which measures a position of the host vehicle 200 using a satellite or the like, a storage device 76 that stores map information 96, and a user interface (for example, a touch panel display, a speaker, and a microphone). The navigation device 38, using the positioning device and the map information 96, generates a travel route from the position of the host vehicle 200 to a destination point designated by the user. The position information of the host vehicle 200 and information concerning the travel route are output to the vehicle control device 20.

The communications device 40 is configured to be capable of communicating with external devices including roadside devices, other vehicles, and a server, and transmits and receives, for example, information related to traffic facilities (traffic signals, etc.), information related to other vehicles, probe information, or the most recent map information 96. Each of such information is output to the vehicle control device 20.

The vehicle sensors 14 include, in addition to a velocity sensor 44 for detecting a vehicle velocity (vehicle speed) V, various other non-illustrated sensors, such as an acceleration sensor for detecting an acceleration, a yaw rate sensor for detecting an angular velocity about a vertical axis, a lateral G sensor for detecting a lateral G force, an azimuth sensor for detecting a direction and orientation, and a gradient sensor for detecting a gradient of the vehicle. Signals detected by the respective sensors are output to the vehicle control device 20.

The automated driving switch 16, for example, is a switch provided on the steering wheel or an instrument panel or the like. The automated driving switch 16 is configured to be capable of switching between a plurality of driving modes, by manual operation thereof by a user including the driver. The automated driving switch 16 outputs a mode switching signal to the vehicle control device 20.

The operation detecting sensors 18 detect the presence or absence of operations by the driver, operation amounts, operation positions, and the like, for the various non-illustrated operating devices. The operation detecting sensors 18 of the present embodiment include an accelerator pedal sensor 48 for detecting an amount or the like by which the accelerator pedal is operated, a torque sensor 50 for detecting a steering torque input by the steering wheel, a direction indication sensor 52 for detecting a direction in which the direction indicator (turn signal) switch is operated, and a brake pedal sensor (not shown) for detecting an amount or the like by which the brake pedal is operated. Signals detected by the respective sensors are output to the vehicle control device 20.

[1.3 Specific Configuration of Output System Device Group]

The driving force device 22 is constituted from a driving force ECU (Electronic Control Unit), and a drive source including an engine and/or a driving motor. The driving force device 22 generates a travel driving force (torque) for the host vehicle 200 in accordance with vehicle control values output from the vehicle control device 20, and transmits the travel driving force to the vehicle wheels directly or through a transmission.

The steering device 24 is constituted from an EPS (electric power steering system) ECU, and an EPS actuator. The steering device 24 changes the orientation of the vehicle wheels (steered wheels) in accordance with vehicle control values output from the vehicle control device 20.

The braking device 26, for example, is an electric servo brake used in combination with a hydraulic brake, and is made up from a brake ECU and a brake actuator. The braking device 26 brakes the vehicle wheels in accordance with vehicle control values output from the vehicle control device 20.

The notification device 28 is made up from a notification ECU, a display device, an audio device, and a haptic (tactile sensory) device. The notification device 28 carries out a notifying operation to provide a notification in relation to automated driving or manual driving, in accordance with a notification command output from the vehicle control device 20. When the notifying operation is performed, the notification ECU controls one or more of the display device, the acoustic device, and the haptic device. At this time, the notification ECU may change the device that is operated or the operations thereof per se in accordance with the notified content.

[1.4 Driving Modes]

The automated driving mode is a driving mode in which the host vehicle 200 travels under the control of the vehicle control device 20, in a state in which the driver does not operate the operating devices (specifically, the accelerator pedal, the steering wheel, and the brake pedal). Stated otherwise, in the automated driving mode, the vehicle control device 20 controls a portion or all of the driving force device 22, the steering device 24, and the braking device 26 in accordance with sequentially created action plans. When the driver performs a predetermined operation using the operating devices during implementation of the automated driving mode, the automated driving mode is canceled automatically, together with switching to a driving mode (including a manual driving mode) in which the level of driving automation is relatively low.

[1.5. Configuration of Vehicle Control Device 20]

Figure 2:
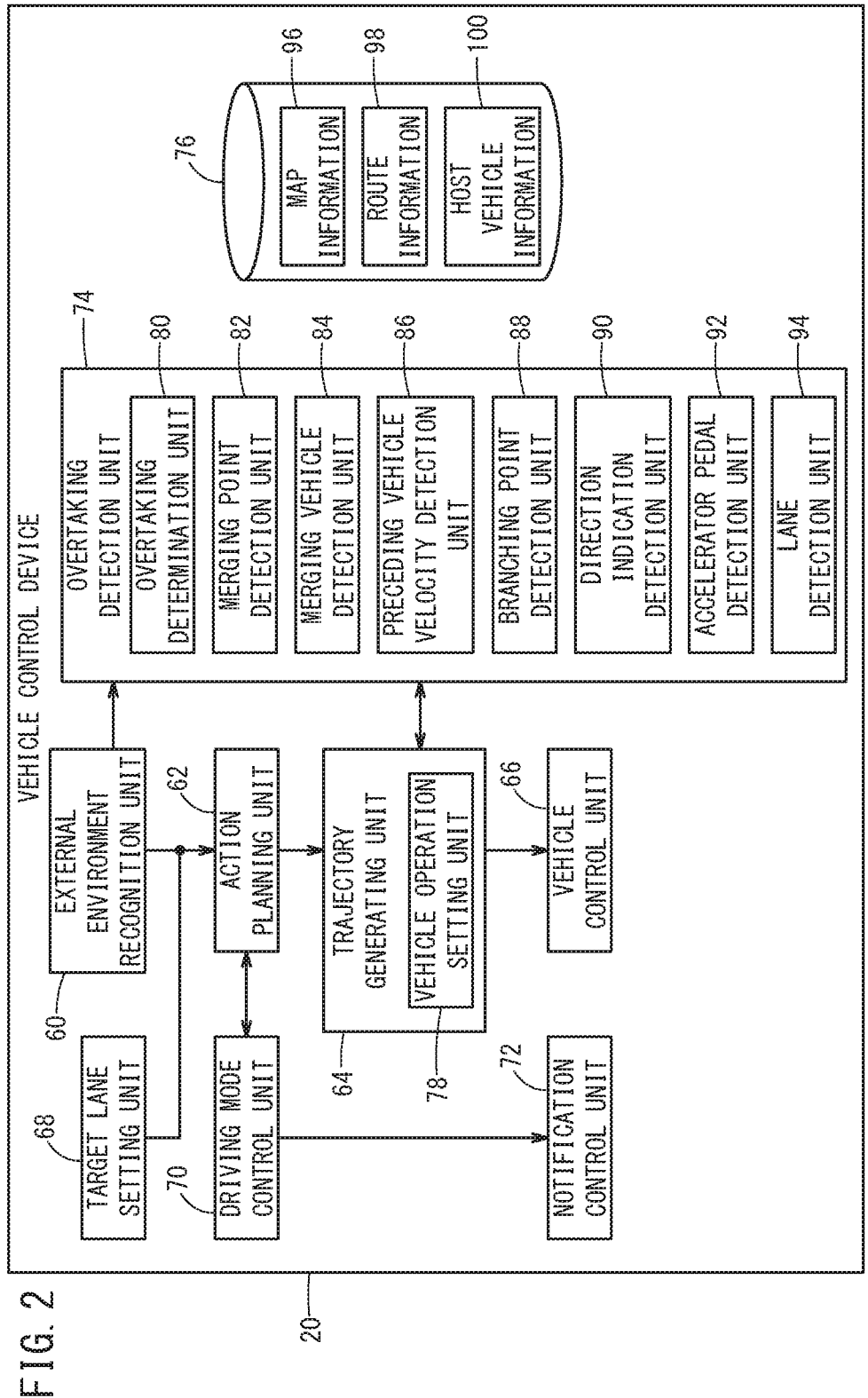
FIG. 2 is a block diagram showing a configuration of the vehicle control device according to an embodiment of the present invention.

The vehicle control device 20 will now be described with reference to FIG. 2. The vehicle control device 20 is constituted by one or a plurality of ECUs, and comprises the storage device 76 and various function realizing units. According to the present embodiment, the function realizing units are software-based functional units, in which the functions thereof are realized by a CPU (central processing unit) executing programs that are stored in the storage device 76. Alternatively, the function realizing units may be hardware-based functional units made up from integrated circuits such as field-programmable gate arrays (FPGA) or the like. The function realizing units include an external environment recognition unit 60, an action planning unit 62, a trajectory generating unit 64, a vehicle control unit 66, a target lane setting unit 68, a driving mode control unit 70, a notification control unit 72, and an overtaking detection unit 74.

The external environment recognition unit 60 recognizes static external environmental information around the periphery of the host vehicle 200, and generates external environment recognition information, using the external environmental information acquired by the external environment sensors 12, and the map information 96 stored in the storage device 76. Static external environmental information includes recognized objects such as lane markings, stop lines, traffic signals, geographic features (real estate), travel capable regions, and the like. Further, the static external environmental information also includes position information for each of the recognized objects. Using the external environmental information acquired by the external environment sensors 12, and the information received by the communications device 40, the external environment recognition unit 60 recognizes dynamic external environmental information around the periphery of the host vehicle 200, and generates external environment recognition information. The dynamic external environmental information includes, for example, obstacles such as parked or stopped vehicles, traffic participants such as pedestrians and other vehicles (including bicycles), etc., and traffic signals (light colors of the traffic signals), and the like. Further, the dynamic external environmental information also includes information concerning directions of movement of each of the recognized objects.

On the basis of the recognition results from the external environment recognition unit 60, the action planning unit 62 creates action plans (a time series of events) for each of respective travel segments, and updates the action plans as needed. As types of events, for example, there may be cited events in relation to deceleration, acceleration, branching, merging, lane keeping, course changing (including lane changing), and passing or overtaking other vehicles. In this instance, "deceleration" and "acceleration" are events in which the host vehicle 200 is made to decelerate or accelerate. "Branching" and "merging" are events in which the host vehicle 200 is made to travel smoothly at a branching point or a merging point. "Course changing" is an event in which a change is made to the travel position in a lateral direction of the host vehicle 200. "Passing" (or "overtaking") is an event in which a preceding vehicle 202 (refer to FIG. 6, etc.) is overtaken by the host vehicle 200. Further, "lane keeping" is an event in which the host vehicle 200 is made to travel without departing from a travel lane 226 (refer to FIG. 6, etc.), and is subdivided into a combination of travel modes. More specifically, as such travel modes, there may be included constant speed traveling, follow-on traveling, traveling while decelerating, traveling through a curve, or traveling to avoid obstacles.

Using the map information 96, the route information 98, and host vehicle information 100, which are read out from the storage device 76, the trajectory generating unit 64 generates a planned travel trajectory in accordance with the action plan created by the action planning unit 62. The planned travel trajectory is data indicative of a time series of target vehicle operations, and more specifically, is a time series data set, in which the data units thereof are defined by a position, a posture angle, a velocity, an acceleration or deceleration, a curvature, a yaw rate, a steering angle, and a lateral G force. According to the present embodiment, the trajectory generating unit 64 functions as a vehicle operation setting unit 78.

The vehicle operation setting unit 78 determines target vehicle operations for the host vehicle 200 during automated driving. Further, in the case that an action plan such as a course change or the like is created by the action planning unit 62, at least one of a portion of target operation values, in this instance, a velocity, an acceleration/deceleration, a curvature, a yaw rate, a steering angle, and a lateral G force, are set to be less than or equal to upper limit values thereof that are stored in the storage device 76.

The vehicle control unit 66 determines respective vehicle control values in order to control traveling of the host vehicle 200, in accordance with the planned travel trajectory generated by the trajectory generating unit 64. In addition, the vehicle control unit 66 outputs the determined vehicle control values, respectively, to the driving force device 22, the steering device 24, and the braking device 26.

The target lane setting unit 68 sets the target lane based on the position of the host vehicle 200 as measured by the navigation device 38, the map information 96 that is read out from the storage device 76, and the route information 98. In the case that a destination for the host vehicle 200 is set by the driver, the target lane setting unit 68 sets as the target lane an optimal travel lane 226 along a route from the current position to the destination. Further, in the case that a destination of the host vehicle 200 is not set by the driver, the target lane setting unit 68 sets as the target lane a leftmost travel lane 226 from among the forward heading travel lanes 226. Information concerning the target lane is used by the action planning unit 62.

In accordance with a signal output from the automated driving switch 16, the driving mode control unit 70 performs a transition process to transition from the manual driving mode to the automated driving mode, or a transition process to transition from the automated driving mode to the manual driving mode. Further, the driving mode control unit 70 performs a transition process to transition from the automated driving mode to the manual driving mode, in accordance with signals output from the operation detecting sensors 18.

In the case that a transition process is carried out by the driving mode control unit 70 to transition from the automated driving mode to the manual driving mode, or in the case that a takeover request is performed to request that the responsibility for driving be taken over by the driver, the notification control unit 72 outputs a notification command with respect to the notification device 28.

The overtaking detection unit 74 estimates the intention (whether to overtake or not) of the driver when a lane change is carried out automatically with the operation performed by the driver serving as a trigger. The overtaking detection unit 74 functions as an overtaking determination unit 80, a merging point detection unit 82, a merging vehicle detection unit 84, a preceding vehicle velocity detection unit 86, a branching point detection unit 88, a direction indication detection unit 90, an accelerator pedal detection unit 92, and a lane detection unit 94.

Using the detection results of the respective detection units 82, 84, 86, 88, 90, 92, and 94 (refer to item [2.3] below), the overtaking determination unit 80 determines whether or not the lane change is for the purpose of overtaking a preceding vehicle 202. The determination result is used by the vehicle operation setting unit 78 of the trajectory generating unit 64. Using the measurement result of the navigation device 38, the map information 96, and the route information 98, the merging point detection unit 82 determines whether or not a merging point 204 (see FIG. 6) exists in the travel route 208 within a predetermined distance from the host vehicle 200. For detecting the merging point 204, image information which is captured by the cameras 32 can also be used. Moreover, instead of the merging point detection unit 82, the merging vehicle detection unit 84 may be provided. Using image information captured by the cameras 32, the merging vehicle detection unit 84 detects whether or not a merging vehicle 206 (see FIG. 6) exists which is merging into the travel route 208 in front of the host vehicle 200. For detecting the merging vehicle 206, the detection results of the radar devices 34 or the LIDAR devices 36 can be used, and communication information from the merging vehicle 206 which is received by the communications device 40 can also be used.

The preceding vehicle velocity detection unit 86 detects the travel velocity of the preceding vehicle 202, using the detection results (inter-vehicle distance) of the radar devices 34 and the detection results of the velocity sensor 44. Using the measurement result of the navigation device 38, the map information 96, and the route information 98, the branching point detection unit 88 determines whether or not a branching point 214 (see FIG. 8) exists in the travel route 208 within a predetermined distance from the host vehicle 200. For detecting the branching point 214, image information which is captured by the cameras 32 can also be used. Using the detection results of the torque sensor 50 or the direction indication sensor 52, the direction indication detection unit 90 detects a direction indicating operation of the host vehicle 200. Using the detection result of the accelerator pedal sensor 48, the accelerator pedal detection unit 92 detects that an accelerator pedal operation of the host vehicle 200 is being performed. Using image information captured by the cameras 32, the lane detection unit 94 detects the travel lane 226 (see FIG. 7) in which the host vehicle 200 is traveling, and the transition direction of the host vehicle 200 at the time of making a lane change. For detecting the travel lane 226, the measurement result of the navigation device 38 and the map information 96 can also be used.

The storage device 76 stores the map information 96, the route information 98, and the host vehicle information 100. The map information 96 is information output from the navigation device 38 or the communications device 40. The route information 98 is information concerning the planned travel route that is output from the navigation device 38. The host vehicle information 100 includes respective detection values output from the vehicle sensors 14. The storage device 76 also stores various numerical values used by the vehicle control device 20. The storage device 76 stores first upper limit values of target values for various vehicle operations that are set when making a lane change that is not for the purpose of overtaking, and second upper limit values (which are greater than the first upper limit values) of target values for various vehicle operations that are set when making a lane change that is for the purpose of overtaking. The form of a lane change which is not for the purpose of overtaking includes a lane change into a target lane that is set along the route to the destination, and a lane change to avoid other vehicles that enter into the lane ahead of the host vehicle 200.

[2. Process Performed by Vehicle Control Device 20]

Process steps performed by the vehicle control device 20 will now be described, with a lane change serving as an example of one form of a course change. With automatically driven vehicles, there are cases in which the host vehicle 200 determines the timing at which a lane change is made, as well as cases in which the driver determines the timing at which a lane change is made. Hereinafter, a case in which the host vehicle 200 determines the timing at which a lane change is made (item [2.1] below), and a case in which the driver determines the timing at which a lane change is made (item [2.2] below) will be described separately.

[2.1 Process in Which the Host Vehicle 200 Determines the Timing at Which a Lane Change is Made]

Figure 3:
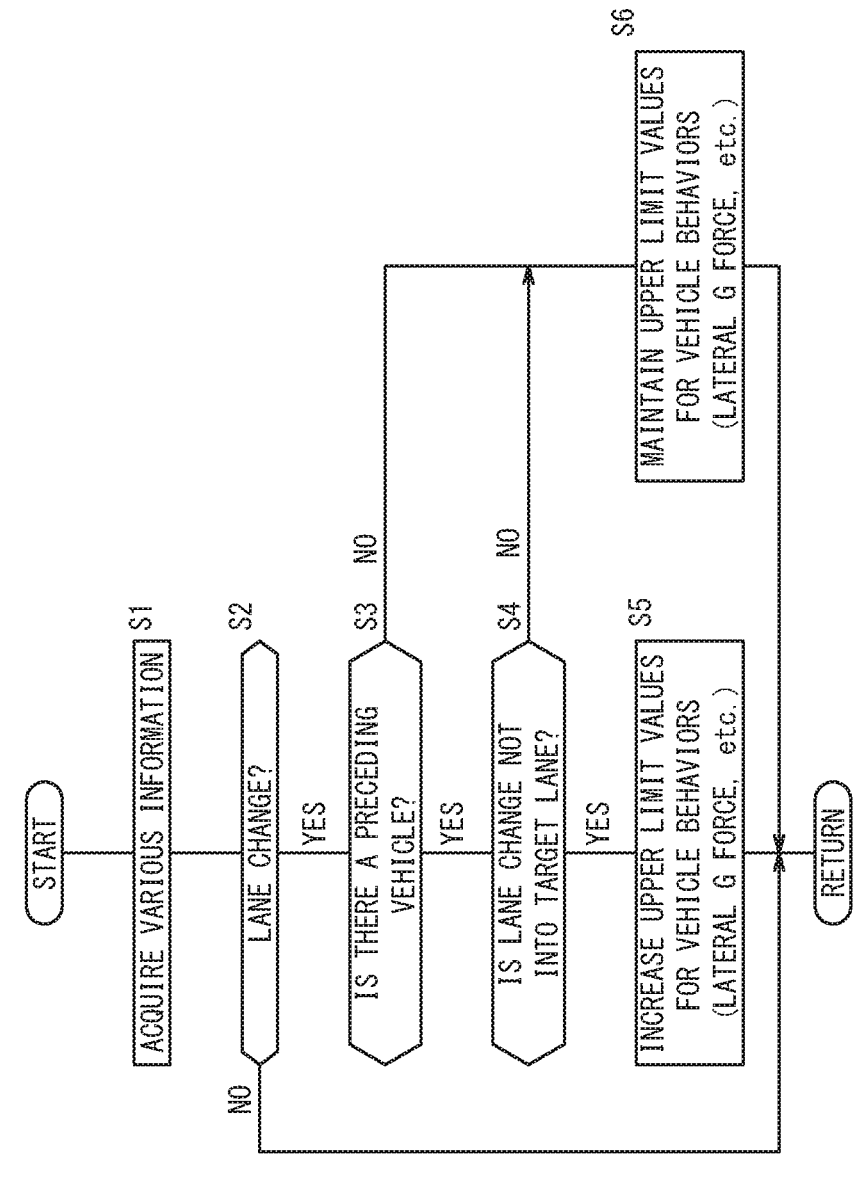
FIG. 3 is a flowchart of a process for a case in which a lane change is performed in accordance with a determination of the vehicle control device.

Process steps performed by the vehicle control device 20 will be described with reference to FIG. 3. The process described below is executed during automated driving, in which the vehicle control device 20 performs in their entirety a vehicle lane change determination and a lane change vehicle control. The processes shown in FIG. 3 are executed periodically.

In step S1, various types of information are acquired. The vehicle control device 20 obtains the external environmental information from the external environment sensors 12, and acquires various signals from the vehicle sensors 14. The action planning unit 62 creates an action plan on the basis of the recognition results from the external environment recognition unit 60, the various signals from the vehicle sensors 14, and the target lane information set by the target lane setting unit 68. In addition, together with the action plan, a result of the determination of the existence of a preceding vehicle 202, and information as to whether or not there is a lane change into the target lane, is sent to the trajectory generating unit 64.

In step S2, the trajectory generating unit 64 determines whether or not the action plan created by the action planning unit 62 involves making a lane change. In the case that a lane change is to be made (step S2: YES), the process transitions to step S3. On the other hand, if a lane change is not to be made (step S2: NO), a planned travel trajectory is generated in accordance with the action plan, and the process is temporarily halted.

In step S3, the vehicle operation setting unit 78 of the trajectory generating unit 64 determines the presence or absence of a preceding vehicle 202. In the event there is a preceding vehicle 202 (step S3: YES), the process transitions to step S4. On the other hand, in the case there is not a preceding vehicle 202 (step S3: NO), the process transitions to step S6.

In step S4, the vehicle operation setting unit 78 determines whether or not a lane change is to be made into the target lane. In the case that a lane change into the target lane is not to be made (step S4: YES), the process transitions to step S5. On the other hand, in the case that a lane change into the target lane is to be made (step S4: NO), the process transitions to step S6.

In step S5, the vehicle operation setting unit 78 increases the upper limit values of target values for various vehicle operations, for example, the velocity, the acceleration, the curvature, the yaw rate, the steering angle, and the lateral G force, and then generates a planned travel trajectory in accordance with an action plan. At this time, second upper limit values are read out from the storage device 76 and set. As a result of this process, it is possible to increase the target values for the vehicle operations, and a rapid lane change can be realized. In other words, according to the present embodiment, in the event there is a preceding vehicle 202, and a lane change into the target lane is not being made, the lane change is promptly permitted.

In the case of transitioning from step S3 or step S4 to step S6, the vehicle operation setting unit 78 maintains the upper limit values of the target values for the vehicle operations at the normal set values therefor, and then generates the planned travel trajectory in accordance with the action plan. At this time, the first upper limit values are read out from the storage device 76 and set.

[2.2 Process in which the Driver Determines the Timing at Which a Lane Change is Made]

Figure 4:
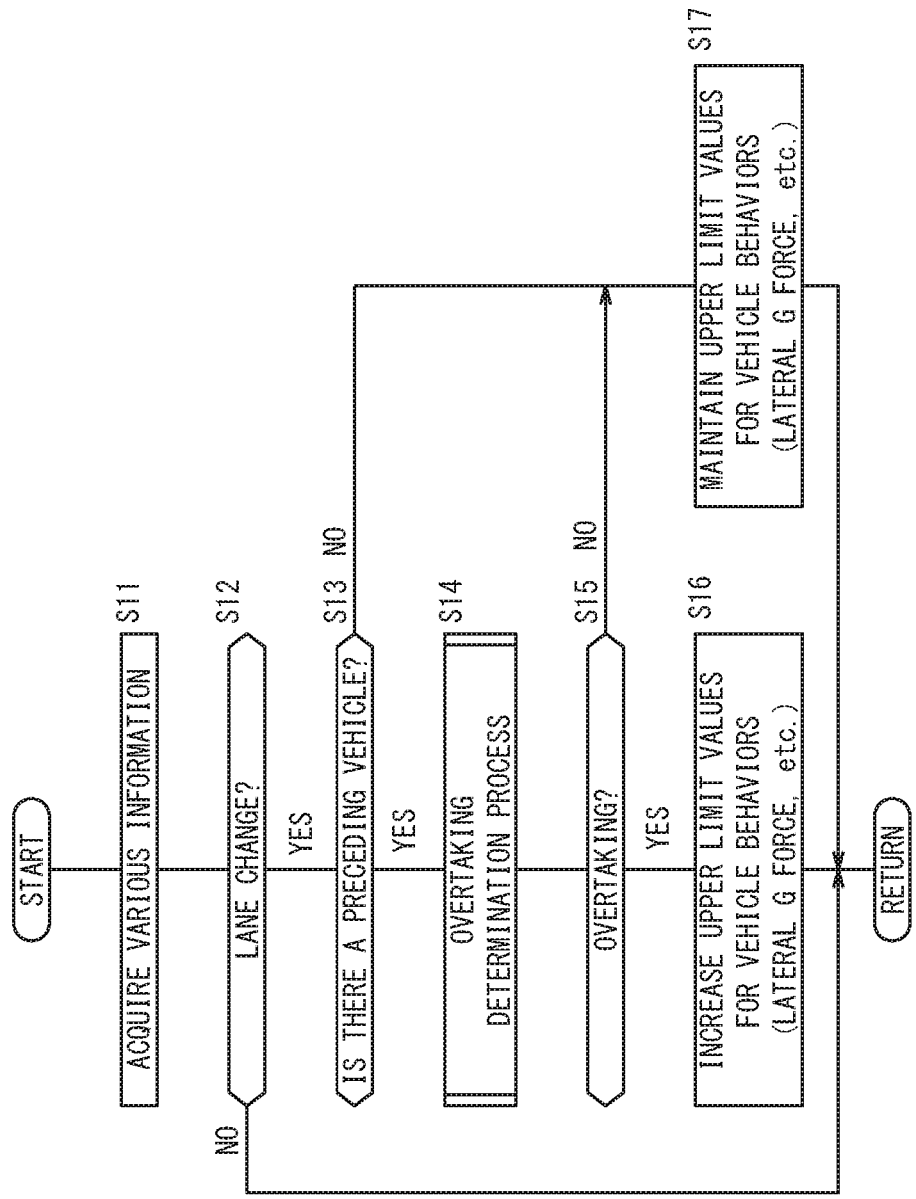
FIG. 4 is a flowchart of a process for a case in which a lane change is performed in accordance with a determination made by the driver.

Process steps performed by the vehicle control device 20 will be described with reference to FIG. 4. The process described below is executed during automated driving, in which the driver performs the vehicle lane change determination, and the vehicle control device 20 performs the lane change vehicle control. The processes shown in FIG. 4 are executed periodically.

In the case that the driver intends to make a lane change during automated driving (for example during a lane maintenance control), the driver operates the steering wheel or the direction indicator (turn signal) switch in a direction in which the driver desires to make the lane change. When the steering wheel is operated, a torque signal is output from the torque sensor 50 of the operation detecting sensors 18. When the direction indicator (turn signal) switch is operated, a direction indicating signal is output from the direction indication sensor 52 of the operation detecting sensors 18.

In step S11, various types of information are acquired. The vehicle control device 20 obtains the external environmental information from the external environment sensors 12, and acquires various signals from the vehicle sensors 14 and the operation detecting sensors 18. The action planning unit 62 creates an action plan on the basis of the recognition results from the external environment recognition unit 60, as well as the various signals from the vehicle sensors 14 and the operation detecting sensors 18. In the case that the vehicle control device 20 inputs a torque signal from the torque sensor 50, or inputs a direction indicating signal from the direction indication sensor 52, the action planning unit 62 creates an action plan for carrying out the lane change. In addition, together with the action plan, a result of the determination of the existence of a preceding vehicle 202 is sent to the trajectory generating unit 64.

In step S12, the trajectory generating unit 64 determines whether or not the action plan created by the action planning unit 62 involves making a lane change. In the case that a lane change is to be made (step S12: YES), the process transitions to step S13. On the other hand, if a lane change is not to be made (step S12: NO), a planned travel trajectory is generated in accordance with the action plan, and the process is temporarily halted.

In step S13, the vehicle operation setting unit 78 of the trajectory generating unit 64 determines the presence or absence of a preceding vehicle 202. In the event there is a preceding vehicle 202 (step S13: YES), the process transitions to step S14. On the other hand, in the case there is not a preceding vehicle 202 (step S13: NO), the process transitions to step S17.

In step S14, an overtaking determination process is performed. The overtaking determination process will be described in item [2.3] below. In step S15, the vehicle operation setting unit 78 determines whether the lane change made by the driver is intended as being for the purpose of overtaking or not. In the case that the lane change is determined to be for the purpose of overtaking (step S15: YES), the process transitions to step S16. In the case that the lane change is determined not to be for the purpose of overtaking (step S15: NO), the process transitions to step S17.

In step S16, the vehicle operation setting unit 78 further increases the upper limit values of the target values for the various vehicle operations, for example, the velocity, the acceleration, the curvature, the yaw rate, the steering angle, and the lateral G force, and then generates the planned travel trajectory in accordance with the action plan. At this time, second upper limit values are read out from the storage device 76 and set. As a result of this process, it is possible to increase the target values for the vehicle operations, and a rapid lane change can be realized. In other words, according to the present embodiment, in the event there is a preceding vehicle 202, and a lane change into the target lane is not being made, the lane change is promptly permitted.

In the case of transitioning from step S13 or step S15 to step S17, the vehicle operation setting unit 78 maintains the upper limit values of the target values for the vehicle operations at the normal set values therefor, and then generates the planned travel trajectory in accordance with the action plan. At this time, the first upper limit values are read out from the storage device 76 and set.

[2.3 Overtaking Determination Process]

Figure 5:
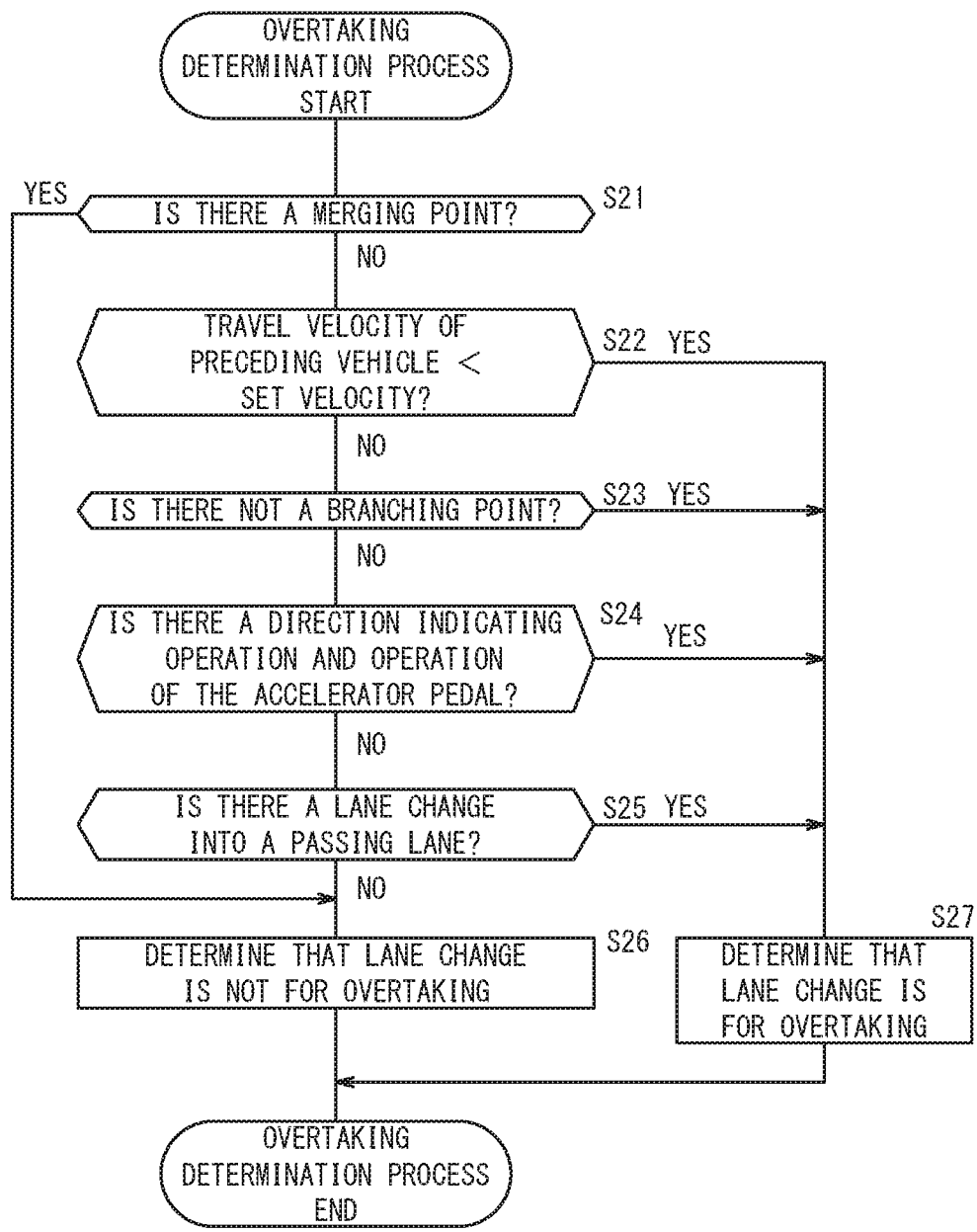
FIG. 5 is a flowchart of an overtaking determination process.

The overtaking determination process which is performed in step S14 of FIG. 4 will now be described with reference to FIG. 5. The following process is implemented in order to estimate, based on circumstances around the periphery of the host vehicle 200, whether or not the operation of making a lane change performed by the driver was carried out with the intention of overtaking a preceding vehicle.

In step S21, on the basis of the detection result from the merging point detection unit 82, the overtaking determination unit 80 determines whether or not a merging point 204 exists in the travel route 208 within a predetermined distance from the position of the host vehicle 200. If there is not a merging point 204 (see FIG. 6) (step S21: NO), the process transitions to step S22. On the other hand, if there is a merging point 204 (step S21: YES), the process transitions to step S26. In the case of having transitioned to step S26, the overtaking determination unit 80 determines that passing or overtaking is not to take place.

Figure 6:
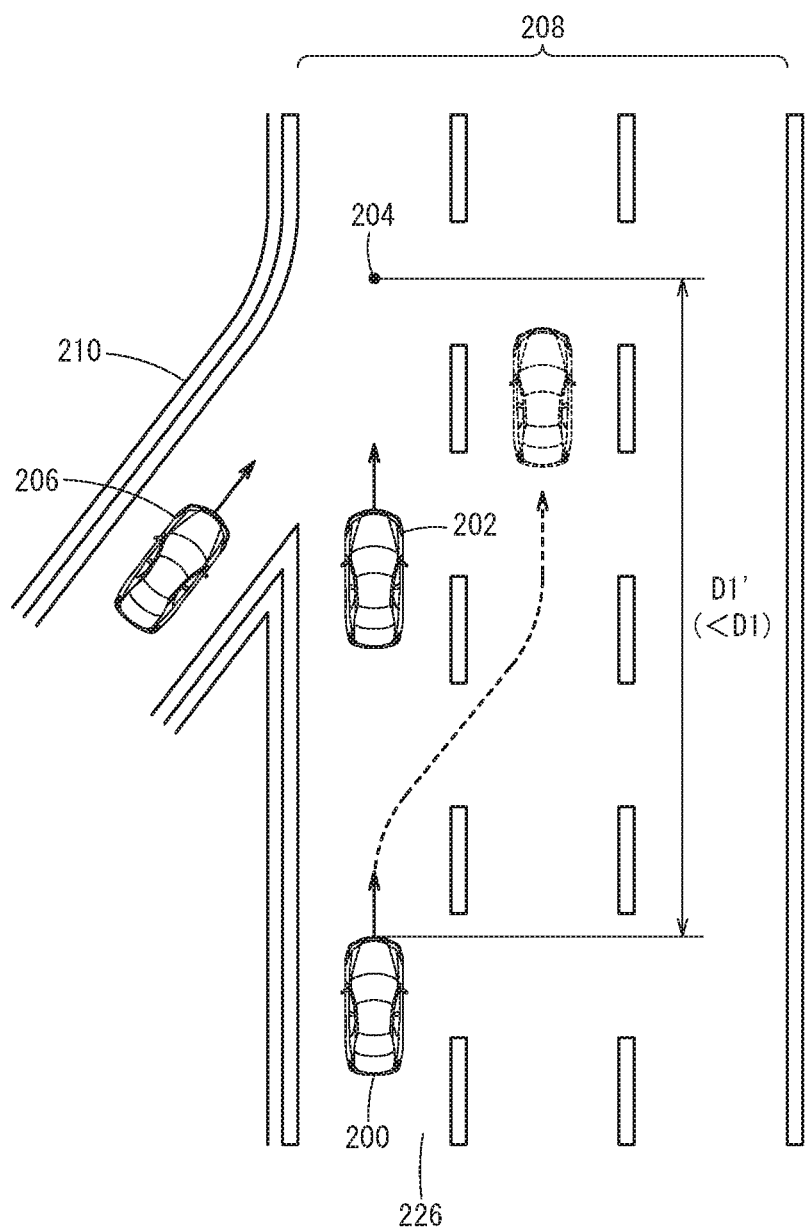
FIG. 6 is a diagram showing a state in which a host vehicle makes a lane change before arriving at a merging point.

For example, as shown in FIG. 6, a situation is assumed in which there is a merging point 204 at a forward position, by a distance D1' (which is smaller than a predetermined distance D1) from the current position of the host vehicle 200. In the case that the host vehicle 200 is nearing the merging point 204, the driver has a tendency to perform a lane change operation in advance, in order to avoid a situation in which the merging vehicle 206, which is in the process of merging at the merging point 204, cuts in front of the host vehicle 200. When the lane change is performed under the situation shown in FIG. 6, the overtaking determination unit 80 estimates the behavior of the driver in such a situation, and determines that the lane change is not for the purpose of overtaking, even if a preceding vehicle 202 is traveling in front of the host vehicle 200.

Further, additional conditions may be added to the determination of step S21. For example, in the case that the travel lane 226 of the host vehicle 200, which is detected by the lane detection unit 94, is closer to a merging lane 210 than other lanes within the travel route 208, the overtaking determination unit 80 may determine that the lane change is not for the purpose of overtaking. Further, in the case that the lane change direction as detected by the direction indication detection unit 90 is on a side opposite to the merging lane 210, the overtaking determination unit 80 may determine that the lane change is not for the purpose of overtaking.

Instead of or in addition to the merging point detection unit 82, the overtaking determination unit 80 may also determine whether or not a merging vehicle 206 exists in the travel route 208 within a predetermined distance D1 from the position of the host vehicle 200 on the basis of a detection result from the merging vehicle detection unit 84.

In step S22, based on the detection results of the preceding vehicle velocity detection unit 86, the overtaking determination unit 80 determines whether or not the travel velocity of the preceding vehicle 202 is less than a predetermined set velocity. If the velocity is greater than or equal to the set velocity (step S22: NO), the process transitions to step S23. On the other hand, if the velocity is less than the set velocity (step S22: YES), the process transitions to step S27. In the case of having transitioned to step S27, the overtaking determination unit 80 determines that passing or overtaking is to take place.

Figure 7:
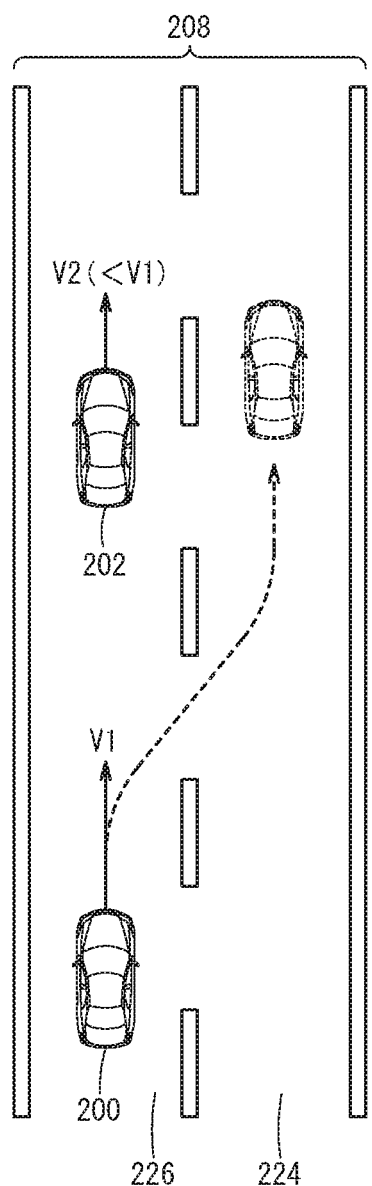
FIG. 7 is a diagram showing a state in which the host vehicle makes a lane change into a passing lane.

For example, as shown in FIG. 7, a case is assumed in which, while the host vehicle 200 is traveling at a set velocity V1, the preceding vehicle 202 is traveling at a velocity V2 (which is smaller than the set velocity V1). In such a case, there is a tendency for the driver to perform an operation to make a lane change in order to overtake the preceding vehicle 202. The overtaking determination unit 80 estimates such a behavior of the driver, and determines that the lane change, which is performed in a situation such as that shown in FIG. 7, is with the intention of overtaking.

In step S23, on the basis of the detection result from the branching point detection unit 88, the overtaking determination unit 80 determines whether or not a branching point 214 exists in the travel route 208 within a predetermined distance from the position of the host vehicle 200. If there is a branching point 214 (step S23: NO), the process transitions to step S24. On the other hand, if there is not a branching point 214 (step S23: YES), the process transitions to step S27. In the case of having transitioned to step S27, the overtaking determination unit 80 determines that passing or overtaking is to take place.

Figure 8:
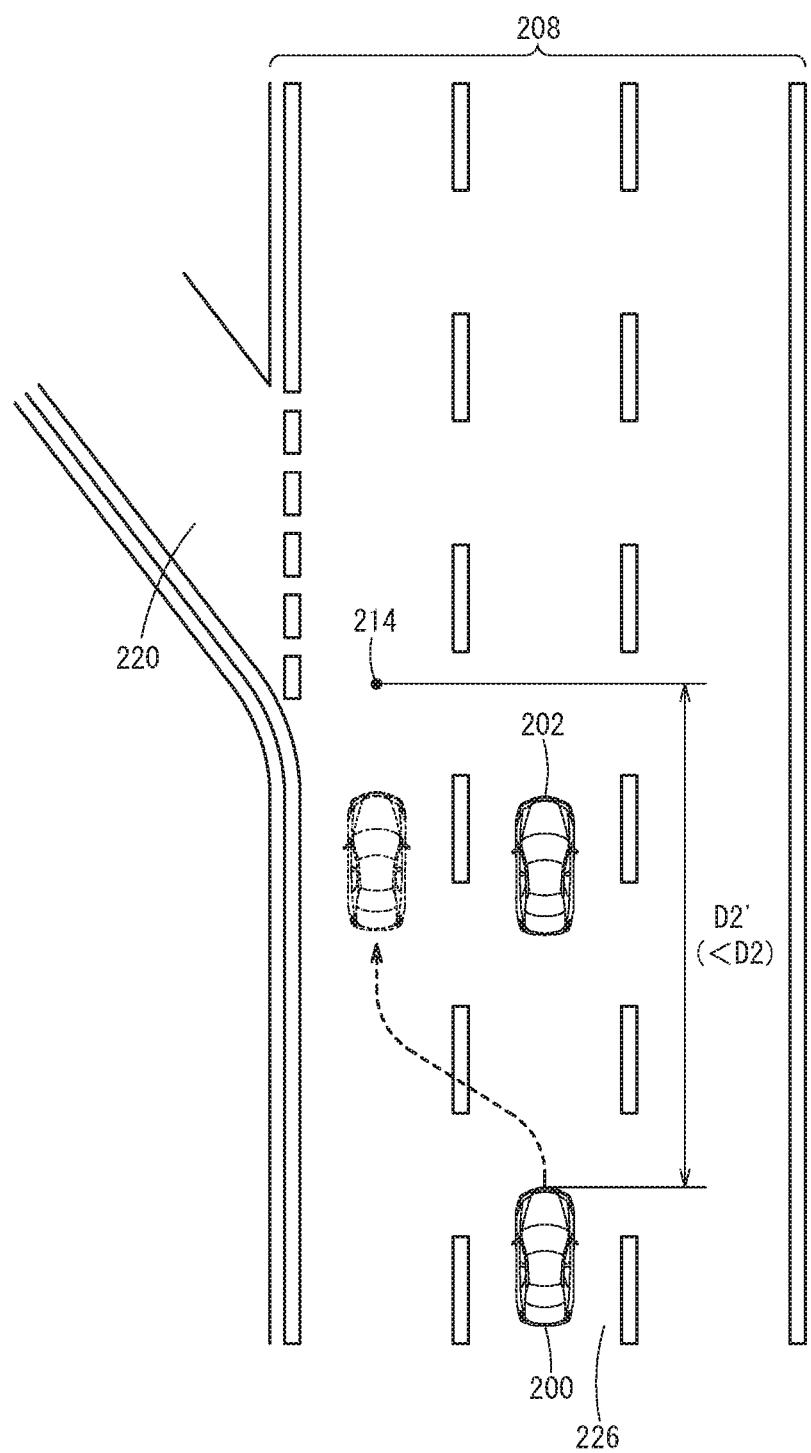
FIG. 8 is a diagram showing a state in which a host vehicle makes a lane change before arriving at a branching point.

For example, as shown in FIG. 8, a situation is assumed in which there is a branching point 214 at a forward position, by a distance D2' (which is smaller than a predetermined distance D2) from the current position of the host vehicle 200. In the case that the host vehicle 200 is to enter into the branching path 220, the driver performs a lane change operation for the purpose of making a course change over to the branching path 220. When the lane change is performed under the situation shown in FIG. 8, the overtaking determination unit 80 estimates the behavior of the driver in such a situation, and determines that there is a possibility that the lane change is not for the purpose of overtaking. Stated otherwise, a lane change in the case that a branching point 214 does not exist is determined to be for the purpose of overtaking.

Further, additional conditions may be added to the determination of step S23. For example, in the case that the lane change direction as detected by the direction indication detection unit 90 is on the side of the branching path 220, the overtaking determination unit 80 may determine that the lane change is not for the purpose of overtaking.

In step S24, based on the detection results of the direction indication detection unit 90 and the accelerator pedal detection unit 92, the overtaking determination unit 80 determines whether there is a direction indicating operation and an accelerator pedal operation. In the case that either one of such operations or both of such operations are not present (step S24: NO), the process transitions to step S25. On the other hand, in the case that both of the operations are present (step S24: YES), the process transitions to step S27. In the case of having transitioned to step S27, the overtaking determination unit 80 determines that passing or overtaking is to take place.

In some cases, the driver may operate the accelerator pedal in order to quickly overtake another vehicle. The overtaking determination unit 80 estimates such a behavior of the driver, and in the case there is a direction indicating operation in addition to an operation of the accelerator pedal, determines that the lane change is for the purpose of overtaking.

In step S25, on the basis of the detection results of the lane detection unit 94, the overtaking determination unit 80 determines whether or not the lane change is a lane change into the passing lane 224 (refer to FIG. 7). In the case that the lane change destination is not the passing lane 224 (step S25: NO), the process transitions to step S26. On the other hand, in the case that the lane change destination is the passing lane 224 (step S25: YES), the process transitions to step S27. In the case of having transitioned to step S27, the overtaking determination unit 80 determines that passing or overtaking is to take place.

For example, as shown in FIG. 7, a case is assumed in which the right lane is the passing lane 224. In such a case, the driver performs an operation to make a lane change into the passing lane 224 for the purpose of overtaking the preceding vehicle 202 that is traveling in the left side travel lane 226. The overtaking determination unit 80 estimates such a behavior of the driver, and determines that the lane change, which is performed in a situation such as that shown in FIG. 7, is with the intention of overtaking.

In step S26, the overtaking determination unit 80 determines that passing or overtaking is not to take place. More specifically, in the case that the determination condition of step S21 is satisfied, or in the case that all of the determination conditions of step S22 to step S25 are not satisfied, the overtaking determination unit 80 determines that overtaking is not to take place.

Moreover, in the overtaking determination process described above, one of the processes from among those of steps S21 to S25 may be performed.

[3. Summary of the Present Embodiment]

The vehicle control device 20 is equipped with the external environment recognition unit 60 that recognizes a preceding vehicle 202 traveling in front of the host vehicle 200, and the vehicle operation setting unit 78 which determines a vehicle operation of the host vehicle 200, and sets a value exhibited by the vehicle operation at a time of making the course change to be less than or equal to an upper limit value thereof. The vehicle operation setting unit 78 causes the upper limit value to differ between a case in which the preceding vehicle 202 is recognized by the external environment recognition unit 60 (step S3 of FIG. 3: YES, step S13 of FIG. 4: YES), and a case in which the preceding vehicle 202 is not recognized by the external environment recognition unit 60 (step S3 of FIG. 3: NO, step S13 of FIG. 4: NO).

There are drivers who wish for the vehicle operation of the host vehicle 200 to change when a change in course is made, depending on the presence or absence of a preceding vehicle 202. In accordance with the aforementioned configuration, the vehicle operation of the host vehicle 200 is changed when a change in course is made, depending on the presence or absence of a preceding vehicle 202. Therefore, the course change can be effected according to the intentions of the driver. As a result, marketability of the vehicle control device 20 is enhanced.

The vehicle operation setting unit 78 sets the upper limit value for the case in which the preceding vehicle 202 is recognized by the external environment recognition unit 60 and a course change to a target lane is not made to be greater than the upper limit value for the case in which the preceding vehicle 202 is not recognized by the external environment recognition unit 60, and to be greater than the upper limit value for a case in which the course change to the target lane is made.

There are drivers who prefer the vehicle operation of the host vehicle 200 to be increased when making a course change that involves overtaking of a preceding vehicle 202, whereas such drivers prefer the vehicle operation of the host vehicle 200 not to be increased when making a course change caused simply by switching the target lane. In accordance with the above configuration, the vehicle operation of the host vehicle 200 is increased when making a course change that involves overtaking of a preceding vehicle 202, and the vehicle operation of the host vehicle 200 is not increased when making a course change caused simply by switching the target lane, and therefore, the course change can be effected according to the intentions of the driver. As a result, marketability of the vehicle control device 20 is enhanced.

The vehicle control device 20 includes the overtaking determination unit 80 that determines, using the recognition result of the external environment recognition unit 60, whether or not the lane change is for the purpose of overtaking the preceding vehicle 202. The vehicle operation setting unit 78 causes the upper limit value to differ between a case in which it is determined by the overtaking determination unit 80 that the lane change is for the purpose of overtaking the preceding vehicle 202, and a case in which it is determined by the overtaking determination unit 80 that the lane change is not for the purpose of overtaking the preceding vehicle 202.

There are drivers who wish for the vehicle operation of the host vehicle 200 to change when a lane change is made, depending on whether or not a preceding vehicle 202 is to be overtaken. In accordance with the aforementioned configuration, the vehicle operation of the host vehicle 200 is changed when the lane change is made, depending on whether or not overtaking is to occur, and therefore, the lane change can be effected according to the intentions of the driver. As a result, marketability of the vehicle control device 20 is enhanced.

The vehicle operation setting unit 78 sets the upper limit value for the case in which it is determined by the overtaking determination unit 80 that the lane change is for the purpose of overtaking the preceding vehicle 202 to be greater than the upper limit value for the case in which it is determined by the overtaking determination unit 80 that the lane change is not for the purpose of overtaking the preceding vehicle 202.

There are drivers who wish for the vehicle operation of the host vehicle 200 to increase when a lane change is made that involves overtaking of a preceding vehicle 202. In accordance with the above configuration, the vehicle operation of the host vehicle 200 at a time of making a lane change that involves overtaking of a preceding vehicle 202 can be made greater than the vehicle operation of the host vehicle 200 at a time of making a lane change that does not involve overtaking of a preceding vehicle 202, and therefore, the lane change can be effected according to the intentions of the driver. As a result, marketability of the vehicle control device 20 is enhanced.

The vehicle control device 20 is further equipped with the preceding vehicle velocity detection unit 86 that detects a travel velocity of the preceding vehicle 202. When making a lane change, in the case that the travel velocity detected by the preceding vehicle velocity detection unit 86 is lower than a set vehicle velocity for the host vehicle 200, the overtaking determination unit 80 determines that the lane change is for the purpose of overtaking the preceding vehicle 202. In accordance with the above configuration, it is possible to easily detect a lane change that involves overtaking of a preceding vehicle 202.

The vehicle control device 20 is further equipped with the branching point detection unit 88 that detects whether or not a branching point 214 exists in the travel route 208 within a predetermined distance from the host vehicle 200. When making a lane change, in the case that the branching point 214 is not detected by the branching point detection unit 88, the overtaking determination unit 80 determines that the lane change is for the purpose of overtaking the preceding vehicle 202. In accordance with the above configuration, it is possible to easily detect a lane change that involves overtaking of a preceding vehicle 202.

The vehicle control device 20 further comprises the direction indication detection unit 90 that detects that a direction indicating operation of the host vehicle 200 is being performed, and an accelerator pedal detection unit 92 that detects that an accelerator pedal operation of the host vehicle 200 is being performed. When making a lane change, in the case that the direction indicating operation is detected by the direction indication detection unit 90, and the accelerator pedal operation is detected by the accelerator pedal detection unit 92, the overtaking determination unit 80 determines that the lane change is for the purpose of overtaking the preceding vehicle 202. In accordance with the above configuration, it is possible to easily detect a lane change that involves overtaking of a preceding vehicle 202.

The vehicle control device 20 is further equipped with the lane detection unit 94 that detects the travel lane 226 in which the host vehicle 200 travels. When making a lane change, in the case that a transition from the travel lane 226 into a passing lane 224 is detected by the lane detection unit 94, the overtaking determination unit 80 determines that the lane change is for the purpose of overtaking the preceding vehicle 202. In accordance with the above configuration, it is possible to easily detect a lane change that involves overtaking of a preceding vehicle 202.

The vehicle control device 20 further comprises a merging point detection unit 82 adapted to detect whether or not a merging point 204 exists in the travel route 208 within a predetermined distance from the host vehicle 200. In the case that the merging point 204 is detected by the merging point detection unit 82, the overtaking determination unit 80 determines that the lane change is not for the purpose of overtaking the preceding vehicle 202, even if a state exists by which it could be determined that the lane change is for the purpose of overtaking the preceding vehicle 202. In accordance with the aforementioned configuration, it is possible to easily detect a lane change that does not involve overtaking of a preceding vehicle 202.

The vehicle control device 20 may further comprise the merging vehicle detection unit 84 which detects a merging vehicle 206 that merges into the travel route 208 in front of the host vehicle 200. In the case that a merging vehicle 206 is detected by the merging vehicle detection unit 84, the overtaking determination unit 80 determines that the lane change is not for the purpose of overtaking a preceding vehicle 202, even if a state exists by which it could be determined that the lane change is for the purpose of overtaking the preceding vehicle 202. In accordance with the aforementioned configuration, it is possible to easily detect a lane change that does not involve overtaking of a preceding vehicle 202.

The present invention is also applicable to a case in which vehicles travel on the right side of the roads.

The vehicle control device according to the present invention is not limited to the embodiment described above, and it is a matter of course that various modified or additional configurations could be adopted therein without deviating from the essence and gist of the present invention.

What is claimed is:

1. A vehicle control device disposed in a host vehicle which is capable of making a course change automatically within a travel route, comprising:
   an external environment recognition unit configured to recognize a preceding vehicle traveling in front of the host vehicle; and
   a vehicle operation setting unit configured to determine a vehicle operation of the host vehicle, and to set a value exhibited by the vehicle operation at a time of making the course change to be less than or equal to an upper limit value thereof;
   wherein the vehicle operation setting unit sets the upper limit value to a greater value in a case in which the preceding vehicle is recognized by the external environment recognition unit, compared to a case in which the preceding vehicle is not recognized by the external environment recognition unit.

2. The vehicle control device according to claim 1, wherein the vehicle operation setting unit sets the upper limit value for the case in which the preceding vehicle is recognized by the external environment recognition unit and a course change to a target lane is not made to be greater than the upper limit value for the case in which the preceding vehicle is not recognized by the external environment recognition unit, and to be greater than the upper limit value for a case in which the course change to the target lane is made.

3. The vehicle control device according to claim 1, wherein the course change is a lane change across a section line, and further comprising:
   an overtaking determination unit configured to determine, using a recognition result of the external environment recognition unit, whether or not the lane change is for the purpose of overtaking the preceding vehicle;
   wherein the vehicle operation setting unit causes the upper limit value to differ between a case in which it is determined by the overtaking determination unit that the lane change is for the purpose of overtaking the preceding vehicle, and a case in which it is determined by the overtaking determination unit that the lane change is not for the purpose of overtaking the preceding vehicle.

4. The vehicle control device according to claim 3, wherein the vehicle operation setting unit sets the upper limit value for the case in which it is determined by the overtaking determination unit that the lane change is for the purpose of overtaking the preceding vehicle to be greater than the upper limit value for the case in which it is determined by the overtaking determination unit that the lane change is not for the purpose of overtaking the preceding vehicle.

5. The vehicle control device according to claim 3, further comprising a preceding vehicle velocity detection unit configured to detect a travel velocity of the preceding vehicle, wherein, when making a lane change, in the case that the travel velocity detected by the preceding vehicle velocity detection unit is lower than a set vehicle velocity for the host vehicle, the overtaking determination unit determines that the lane change is for the purpose of overtaking the preceding vehicle.

6. The vehicle control device according to claim 3, further comprising a branching point detection unit configured to detect whether or not a branching point exists in the travel route within a predetermined distance from the host vehicle, wherein, when making a lane change, in the case that the branching point is not detected by the branching point detection unit, the overtaking determination unit determines that the lane change is for the purpose of overtaking the preceding vehicle.

7. The vehicle control device according to claim 3, further comprising:
   a direction indication detection unit configured to detect that a direction indicating operation of the host vehicle is being performed; and
   an accelerator pedal detection unit configured to detect that an accelerator pedal operation of the host vehicle is being performed;
   wherein, when making a lane change, in the case that the direction indicating operation is detected by the direction indication detection unit, and the accelerator pedal operation is detected by the accelerator pedal detection unit, the overtaking determination unit determines that the lane change is for the purpose of overtaking the preceding vehicle.

8. The vehicle control device according to claim 3, further comprising a lane detection unit configured to detect the lane in which the host vehicle travels, wherein, when making a lane change, in the case that a transition from the travel lane into a passing lane is detected by the lane detection unit, the overtaking determination unit determines that the lane change is for the purpose of overtaking the preceding vehicle.

9. The vehicle control device according to claim 4, further comprising a merging point detection unit configured to detect whether or not a merging point exists in the travel route within a predetermined distance from the host vehicle, wherein, in the case that the merging point is detected by the merging point detection unit, the overtaking determination unit determines that the lane change is not for the purpose of overtaking the preceding vehicle, even if a state exists by which it could be determined that the lane change is for the purpose of overtaking the preceding vehicle.

10. The vehicle control device according to claim 4, further comprising a merging vehicle detection unit configured to detect a merging vehicle that merges into the travel route in front of the host vehicle, wherein, in the case that the merging vehicle is detected by the merging vehicle detection unit, the overtaking determination unit determines that the lane change is not for the purpose of overtaking the preceding vehicle, even if a state exists by which it could be determined that the lane change is for the purpose of overtaking the preceding vehicle.

* * * * *